United States Patent
Le

(10) Patent No.: US 7,184,264 B2
(45) Date of Patent: Feb. 27, 2007

(54) CONNECTABLE MEMORY DEVICES TO PROVIDE EXPANDABLE MEMORY

(75) Inventor: Trung V. Le, White Bear Township, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 10/949,054

(22) Filed: Sep. 23, 2004

(65) Prior Publication Data

US 2006/0061953 A1    Mar. 23, 2006

(51) Int. Cl.
*H05K 7/00* (2006.01)
*G11B 17/04* (2006.01)
*H01B 11/02* (2006.01)
*H01R 12/00* (2006.01)
*H01R 13/62* (2006.01)
*H01L 23/02* (2006.01)

(52) U.S. Cl. ............ 361/685; 361/684; 360/99.06; 174/33; 439/76.1; 439/152; 257/686

(58) Field of Classification Search ............ 439/924.1, 439/660, 630, 76.1, 152–160; 360/99.06; 235/492; 174/33, 52.1–52.4; 361/728–837, 361/679–687, 724–727, 600; 257/686; 711/148
See application file for complete search history.

(56) References Cited

U.S. PATENT DOCUMENTS

| | | | |
|---|---|---|---|
| 6,038,130 A * | 3/2000 | Boeck et al. | 361/735 |
| 6,148,354 A | 11/2000 | Ban et al. | |
| 6,208,380 B1 * | 3/2001 | Misawa | 348/231.9 |
| 6,366,440 B1 * | 4/2002 | Kung | 361/147 |
| 6,381,143 B1 | 4/2002 | Nakamura | |
| 6,385,677 B1 | 5/2002 | Yao | |

(Continued)

FOREIGN PATENT DOCUMENTS

CN    1304115    7/2001

(Continued)

OTHER PUBLICATIONS

Co-pending U.S. Appl. No. 10/644,484, filed Aug. 20, 2003, Trung V. Le, entitled "Memory Card Compatible with Multiple Connector Standards".

(Continued)

*Primary Examiner*—Lisa Lea-Edmonds
*Assistant Examiner*—Zachary Pape
(74) *Attorney, Agent, or Firm*—Eric D. Levinson

(57) ABSTRACT

A memory device is described that is capable of expanding an amount of storage capacity available to a host computer without requiring a user to purchase a new, higher capacity memory device that may be bulky and expensive. The memory device includes a host connector that allows a host computer access to a memory within the memory device. The memory device also includes a first set of electrical contacts accessible through a top major surface of a memory device housing and a second set of electrical contacts accessible through a bottom major surface of the memory device housing. The first and second sets of electrical contacts allow a device, such as another memory device, to couple to the host computer through the memory device. In this way, the amount of memory available to the host computer can be increased while maintaining a small form factor for each of the devices.

13 Claims, 12 Drawing Sheets

U.S. PATENT DOCUMENTS

| | | |
|---|---|---|
| 6,407,940 B1 | 6/2002 | Aizawa |
| 6,490,667 B1 | 12/2002 | Ikeda |
| 6,501,163 B1 | 12/2002 | Utsumi |
| 6,529,385 B1 * | 3/2003 | Brady et al. ............... 361/766 |
| 6,567,273 B1 | 5/2003 | Liu et al. |
| 6,616,053 B2 | 9/2003 | Kondo et al. |
| 6,618,789 B1 | 9/2003 | Okaue et al. |
| 6,654,841 B2 | 11/2003 | Lin |
| 6,670,583 B2 * | 12/2003 | Kara ......................... 219/432 |
| 6,763,410 B2 * | 7/2004 | Yu .............................. 710/74 |
| 6,804,749 B2 * | 10/2004 | Chien et al. ................ 711/115 |
| 6,813,164 B2 * | 11/2004 | Yen ............................ 361/785 |
| 2002/0147882 A1 | 10/2002 | Pua et al. |
| 2002/0177362 A1 * | 11/2002 | Chang ........................ 439/638 |
| 2002/0195500 A1 | 12/2002 | Maruyama |
| 2003/0095386 A1 | 5/2003 | Le et al. |
| 2003/0183698 A1 * | 10/2003 | Wu ............................ 235/492 |
| 2005/0086413 A1 * | 4/2005 | Lee et al. ................... 710/313 |

FOREIGN PATENT DOCUMENTS

| | | |
|---|---|---|
| EP | 1 132 824 A2 | 9/2001 |
| EP | 1 197 826 A1 | 4/2002 |
| WO | WO 01/61692 | 8/2001 |

OTHER PUBLICATIONS

Co-pending U.S. Appl. No. 10/788,623, filed Feb. 27, 2004, Trung V. Le, entitled "Memory Card Compatible with Device Connector and Host Connector Standards".

Co-pending U.S. Appl. No. 10/788,594, filed Feb. 27, 2004, Trung V. Le et al., entitled "Memory Card Host Connector with Retractable Shieldless Tab".

Co-pending U.S. Appl. No. 10/788,591, filed Feb. 27, 2004, Trung V. Le, entitled "Multi-Connector Memory Card with Retractable Sheath to Protect the Connectors".

Co-pending U.S. Appl. No. 10/788,600, filed Feb. 27, 2004, Trung V. Le et al., entitled "Credit Card Sized Memory Card with Host Connector".

Co-pending U.S. Appl. No. 10/928,488, filed Aug. 27, 2004, Steven L. Lindblom et al., entitled "Memory Device with Hub Capability".

"Flashpoint Memory Stick," http://www.hometoys.com, 1 page, printed Nov .24, 2004.

"Xmultiple," http://www.starbusthomepage.com/xflashpointx.htm, 4 pages, printed Dec. 3, 2004.

"Flashpoint," www.xmultiple.com, 1 page, printed Sep. 24, 2004.

* cited by examiner

CONNECTABLE MEMORY DEVICES TO PROVIDE EXPANDABLE MEMORY

TECHNICAL FIELD

The invention relates to removable storage media devices and, more particularly, removable memory drives.

BACKGROUND

A wide variety of removable storage media exists for transferring data from one device to another device. The removable storage media allows users to easily transport data between various devices and various computers. One of the most popular types of removable storage media is the flash memory drive, which is compact, easy to use, and has no moving parts. A flash memory drive includes an internal, high-speed solid-state memory capable of persistently storing data without the application of power.

Numerous other memory standards can also be used in memory drives, including electrically-erasable-programmable-read-only-memory (EEPROM), non-volatile random-access-memory (NVRAM), micro hard disk drives, and other non-volatile or volatile memory types, such as synchronous dynamic random-access-memory (SDRAM), with battery backup. A wide variety of memory drives have been recently introduced, each having different capacities, access speeds, formats, interfaces, and connectors.

Memory drives generally include a specialized connector for coupling to a computing device. For example, a memory drive connector may couple to a host computer via a host computer interface, such as a personal computer memory card international association (PCMCIA) interface including a 16 bit standard PC Card interface and a 32 bit standard CardBus interface, a Universal Serial Bus (USB) interface, a Universal Serial Bus 2 (USB2) interface, a future generation USB interface, an IEEE 1394 FireWire interface, a Small Computer System Interface (SCSI) interface, an Advance Technology Attachment (ATA) interface, a serial ATA interface, an Integrated Device Electronic (IDE) interface, an Enhanced Integrated Device Electronic (EIDE) interface, a Peripheral Component Interconnect (PCI) interface, a PCI Express interface, a conventional serial or parallel interface, or another interface that facilitates attachment to a host computer.

Existing memory drives may include one or more memory storage units that define a fixed storage capacity of the device, which generally cannot be expanded. If higher storage capacity is needed, a user may need to purchase a new memory device with a larger, fixed storage capacity. However, there will always be some storage capacity limit in storage media devices that conform to a specific physical format. For example, many flash memory drives currently have an upper capacity limit of approximately 2 gigabytes (GB) because the small physical format of the flash memory drive allows for only one flash memory chip. If a user wants to use a higher capacity flash drive, the user would typically have to purchase a larger, bulky drive, which typically sells at a more expensive price.

SUMMARY

In general, the invention is directed to a memory device capable of expanding an amount of storage capacity available to a host computer. The memory device includes a host connector that allows a host computer access to a memory within the memory device. The memory device also includes a first set of electrical contacts accessible through a top major surface of a memory device housing and a second set of electrical contacts accessible through a bottom major surface of the memory device housing. The first and second sets of electrical contacts allow a different device, such as another memory device, to couple to the host computer through the memory device.

When a second memory device couples to a first memory device, which is connected to a host computer, a first controller of the first memory device acts as a master controller and a second controller of the second memory device acts as a servant controller (sometimes referred to as a slave controller). In other words, the first controller provides power and read/write data access to a first memory in the first memory device, and the first controller also provides power and read/write data access to the second memory in the second memory device. The master controller virtualizes the first memory and the second memory to be presented to the host computer as a single, larger capacity memory.

A host computer may include only one host computer interface compatible with a specific host connection standard to which both a first memory device and second memory device conform. Conventional memory devices typically require the user to purchase a new memory device to increase storage capacity. However, the memory device described herein allows the second memory device to be stacked adjacent the first memory device by coupling a set of electrical contacts on the first memory device to a set of electrical contacts on the second memory device. In this way, the amount of memory available to the host computer can be increased while maintaining a small form factor for each of the memory devices. Moreover, the memory devices are more versatile in terms of storage capacity because different numbers of memory cards can be stacked to define a desired storage capacity for a given application.

In one embodiment, the invention is directed to a memory device comprising a memory device housing, a memory, a host connector, a first set of electrical contacts, and a second set of electrical contacts. The memory device housing includes a top major surface and a bottom major surface connected by an edge. The memory is enclosed within the memory device housing. The host connector protrudes from the edge of the memory device housing and allows access to the memory by a host computer upon insertion of the host connector into a host computer interface. The first set of electrical contacts is accessible through the top major surface of the memory device housing and the second set of electrical contacts is accessible through the bottom major surface of the memory device housing. At least one of the first and second sets of electrical contacts allows access to another device by the host computer through the memory device upon coupling another set of electrical contacts included in the another device to the one of the first and second sets of electrical contacts.

In another embodiment, the invention is directed to a system comprising a host computer including a host computer interface, a first device, and a second device. The first device includes a first memory, a first set of electrical contacts, and a host connector allowing access to the first memory by the host computer upon insertion of the host connector into the host computer interface of the host computer. The second device includes a second memory and a second set of electrical contacts allowing access to the second memory by the host computer when the host connector of the first device is inserted into the host computer interface of the host computer, and the second set of electrical contacts of the second device are coupled to the first set of electrical contacts of the first device.

In another embodiment, the invention is directed to a method comprising receiving an amount of power from a host computer to enable operation of a first device upon insertion of a host connector of the first device into a host computer interface of the host computer. The method further comprises allowing access to a first memory within the first device via the host computer upon insertion of the host connector into the host computer interface. The method also includes allowing access to a second memory included in a second device through the first device upon coupling a second set of electrical contacts of the second device to a first set of electrical contacts of the first device.

In another embodiment a memory device comprises a housing, a memory in the housing, and a host connector protruding from the housing, the host connector allowing access to the memory by a host computer upon insertion of the host connector into a host computer interface. The memory device also includes a set of electrical contacts disposed on a surface of the housing wherein the set of electrical contacts allows access to another device by the host computer through the memory device upon coupling another set of electrical contacts included in the another device to the set of electrical contacts on the surface of the housing of the memory device.

The invention is capable of providing one or more advantages. For example, a user may snap together several existing memory devices to create a higher capacity storage device without needing to buy a new higher capacity storage device. Furthermore, by keeping the storage capacity of each of the memory devices low, the memory device housing can maintain a small form factor. A plurality of the small form factor memory devices may be stacked adjacent one another to increase an amount of memory available to a host computer while being less bulky and expensive than a single, larger capacity storage device. As an added feature, a battery may also be coupled to the memory devices, to provide supplemental power for servant memory devices.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 53B is a schematic diagram illustrating an exemplary side view of one embodiment of the memory device from FIG. 5A.

DETAILED DESCRIPTION

Figure 1:
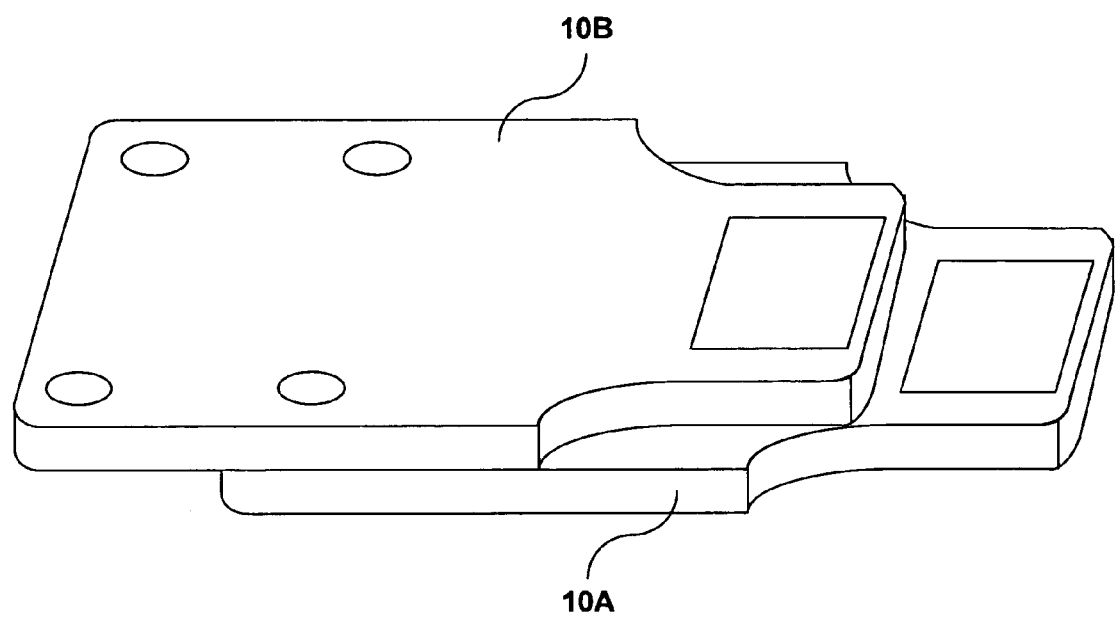
FIG. 1 is a schematic diagram illustrating a first memory device coupled to a second memory device according to an embodiment of the invention.

FIG. 1 is a schematic diagram illustrating a first memory device 10A coupled to a second memory device 10B according to an embodiment of the invention. First memory device 10A is substantially similar to second memory device 10B. As show in FIG. 1, the invention allows second memory device 10B to be stacked adjacent first memory device 10A by coupling to a set of electrical contacts on first memory device 10A. Furthermore, first and second memory devices 10A and 10B are connected such that second memory device 10B is offset from first memory device 10A. The offset allows first memory device 10A to make a clear connection with a host computer interface to couple first and second memory devices 10A and 10B to a host computer. In this way, the amount of memory available to the host computer can be increased while maintaining a small form factor for each of the memory devices. The host computer may see the combined memory of devices 10A and 10B as a single virtual memory.

First memory device 10A includes a host connector that allows a host computer access to a memory within first memory device 10A. First memory device 10A also includes a first set of electrical contacts accessible through a top major surface of a memory device housing. The first set of electrical contacts allows second memory device 10B to couple to the host computer through first memory device 10A. Second memory device 10B includes a second set of electrical contacts that couple with the first set of electrical contacts of first memory device 10A. The second set of electrical contacts is accessible through a bottom major surface of second memory device 10B.

When second memory device 10B couples to first memory device 10A, which is connected to the host computer, a first controller included in first memory device 10A acts as a master controller and a second controller included in second memory device 10B acts as a servant controller (sometimes referred to as a slave controller). In other words, the first controller provides power and read/write data access to a first memory within first memory device 10A, and the first controller also provides power and read/write data access to a second memory within second memory device 10B. The master controller virtualizes the first memory and the second memory to be presented to the host computer as a single, larger capacity memory.

Figure 2:
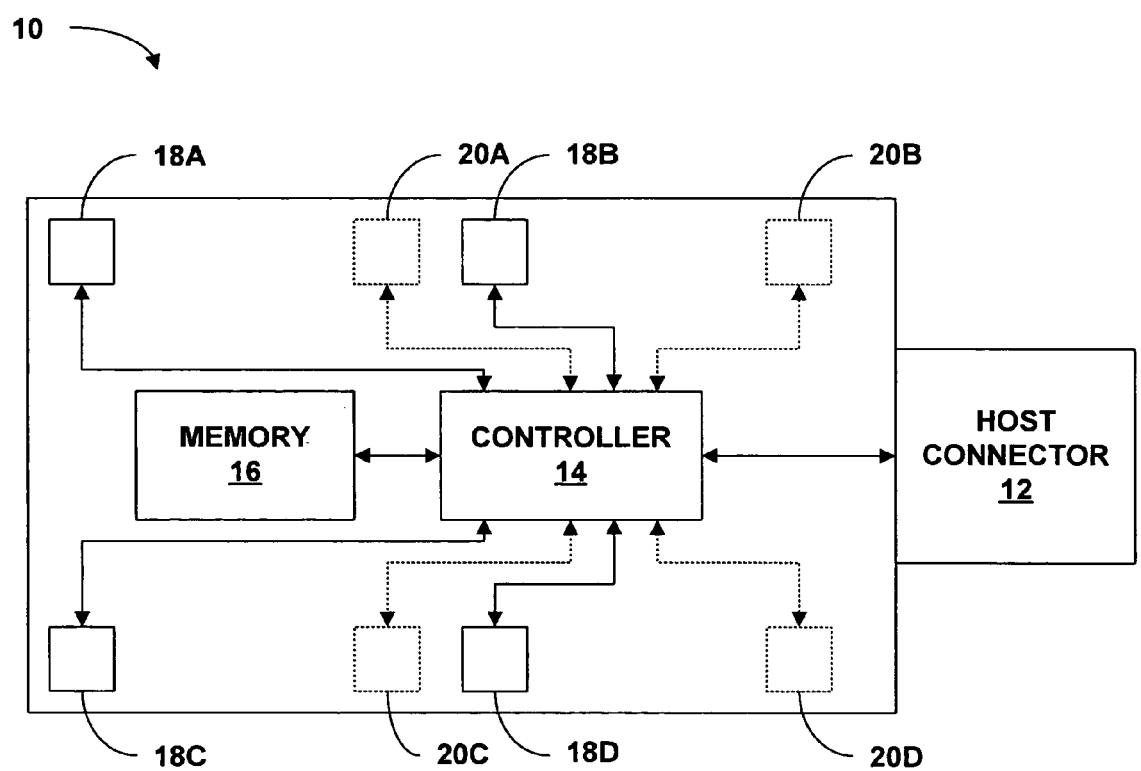
FIG. 2 is a block diagram illustrating a memory device according to an embodiment of the invention.

FIG. 2 is a block diagram illustrating a memory device 10 according to an embodiment of the invention. To ease explanation, it is assumed herein that memory device 10 corresponds to first memory device 10A from FIG. 1. However, memory device 10 may correspond to either first memory device 10A or second memory device 10B illustrated in FIG. 1.

Memory device 10 includes a host connector 12, a controller 14, a memory 16, a first set of electrical contacts 18A–18D (hereinafter "first set of electrical contacts 18"), and a second set of electrical contacts 20A–20D (hereinafter "second set of electrical contacts 20"). Memory device 10 couples to a host computer via host connector 12. The host computer may comprise a laptop computer, a desktop computer, a handheld computer, or the like. Memory device 10 provides first and second sets of electrical contacts 18 and 20 for a device, such as second memory device 10B, to couple to memory device 10. In this way, memory device 10 may expand an amount of storage capacity available to the host computer without requiring a user to purchase a new, higher capacity memory device. Instead, multiple memory devices can be coupled to one another, and presented to the host computer as a single virtual memory device.

A host computer may include a single host computer interface compatible with a specific host connection standard to which host connector 12 conforms. Therefore, a user may not be able to plug more than one memory device into the host computer at the same time. In accordance with the invention, however, memory device 10 allows another memory device substantially similar to memory device 10 to be stacked adjacent memory device 10 by coupling to either first set of electrical contacts 18 or second set of electrical contacts 20, as illustrated in FIG. 1. In this way, both memory devices may be coupled to the host computer via one host computer interface. In this manner, the invention allows the amount of memory available to the host computer to be increased while maintaining a small form factor for each of the memory devices. Moreover, the plurality of memory devices can be presented to the host computer as a single virtual memory device.

Host connector 12 allows access to memory 16 by a host computer (not shown) upon insertion of host connector 12 into a host computer interface included in the host computer. Host connector 12 is electrically coupled to memory 16 via controller 14. Host connector 12 conforms to a host connection standard and the host computer interface of the host computer is also compatible with the host connection standard. The host connection standard may comprise a personal computer memory card international association (PCMCIA) standard including a 16 bit standard PC Card and a 32 bit standard CardBus, a Universal Serial Bus (USB) standard, a Universal Serial Bus 2 (USB2) standard, a future generation USB standard, an IEEE 1394 FireWire standard, a Small Computer System Interface (SCSI) standard, an Advance Technology Attachment (ATA) standard, a serial ATA standard, an Integrated Device Electronic (IDE) standard, an Enhanced Integrated Device Electronic (EIDE) standard, a Peripheral Component Interconnect (PCI) standard, a PCI Express standard, a conventional serial or parallel standard, or another interface that facilitates attachment to a host computer.

By way of example, memory 16 may comprise flash memory, electrically-erasable-programmable-read-only-memory (EEPROM), non-volatile random-access-memory (NVRAM), and other nonvolatile or volatile memory types, such as synchronous dynamic random-access-memory (SDRAM), with battery backup, or another type of memory. In some cases, memory 16 may comprise a micro-hard disk drive.

Each of the first and second sets of electrical contacts 18 and 20 allows access to another device, e.g., second memory device 10B, by the host computer through memory device 10 upon coupling a complimentary set of electrical contacts included in the device to one of first and second sets of electrical contacts 18 and 20. First and second sets of electrical contacts 18 and 20 are electrically coupled to controller 14. In some embodiments, first set of electrical contacts 18 is disposed on a top major surface of memory device 10 and second set of electrical contacts 20 is disposed on a bottom major surface of memory device 10. In that case, memory device 10 and other memory devices substantially similar to memory device 10 may be stacked adjacent one another when connected to the host computer, as illustrated in FIG. 1.

Electrical contacts 18 and 20 may comprise magnets in order to create a self aligning connection between oppositely magnetized electrical contacts of two memory devices. Electrical contacts 18 and 20 may alternatively comprise friction fit mechanical elements that couple with complimentary elements of another memory device. In some embodiments, first set of electrical contacts 18 comprises magnets of a first polarization and second set of electrical contacts 20 comprises magnets of a second polarization substantially opposite the first polarization. In another embodiment, first set of electrical contacts 18 and second set of electrical contacts 20 comprise mechanically fitted contacts, such as pins and sockets.

When memory device 10 is coupled to a host computer via host connector 12, power is delivered through host connector 12 to enable memory device 10. Once enabled, controller 14 allows the host computer access to memory 16. Communication between the host computer and controller 14 may then be sent through powered host connector 12. The host computer may read or modify data that is stored in memory 16 as well as store new data or erase existing data. Controller 14 manipulates the data stored in memory 16 according to operations specified by the host computer. Controller 14 integrates functionality of a memory controller and host connector controller into a single component. In other embodiments, however, memory device 10 may comprise both a memory controller and a host connector controller as separate components.

When another memory device, e.g., second memory device 10B, is coupled to memory device 10 via one of first set of electrical contacts 18 and second set of electrical contacts 20, additional power may be received from the host computer to enable operation of the device. Controller 14 presents both memory 16 of memory device 10 and another memory included in the other memory device to the host computer as a single memory. In this way, coupling the other memory device to memory device 10 creates a composite device. The connected device is dependent on the memory device 10 to communicate with the host computer. In other words, the memory of the connected device is accessible by the host computer through memory device 10.

A user of the host computer may store data in the single virtual memory presented by controller 14. Controller 14 then allocates the data between memory 16 and the memory of the other memory device. Controller 14 separates the received data into data partitions that are independent of each other, e.g., files or folders. The data partitions are then stored in either memory, such that the data stored in the respective memories may be retrieved even when the memory devices are used as separate, individual memory devices.

Controller 14 of memory device 10 operates as a master controller when memory device 10 receives power from the host computer via host connector 12. The other memory device coupled to memory device 10 may also include a similar controller. However, the other controller operates as a servant controller when the memory device receives power from the host computer via the first or second set of electrical contacts 18 or 20. The controllers of both the memory devices may be programmed with master and servant capabilities. The controller operation may be triggered based on how the memory device receives power.

If an amount of power received from the host computer is insufficient to power both memory device 10 and the device coupled to memory device 10, controller 14 may disable electrical contacts 18 and 20. In some embodiments, controller 14 triggers an indicator, e.g., a light emitting diode (LED), included in memory device 10 when the received power is insufficient. If an amount of power received from the host computer is sufficient to power both memory device 10 and the device connected to memory device 10, the one of first and second sets of electrical contacts 18, 20 to which the device is coupled allows the host computer access to the device. Controller 14 may arbitrate with the host computer in attempts to receive sufficient power for memory device 10 and one or more additional memory devices coupled to contacts 18 or 20.

In some embodiments, a battery may be coupled to memory device 10 via first or second set of electrical contacts 18 or 20. The battery may function as a supplemental source of power, in addition to the host computer. In that way, one or more batteries may be included in a plurality of memory devices coupled to the host computer in order to provide sufficient power to enable each of the plurality of memory devices. The battery may also be used to synchronize two or more memory devices without connecting the memory devices to the host computer. The battery provides power to the attached memory devices to allow the data stored on each of the memory devices to replicate itself onto the other memory devices coupled to the battery.

Figure 3:
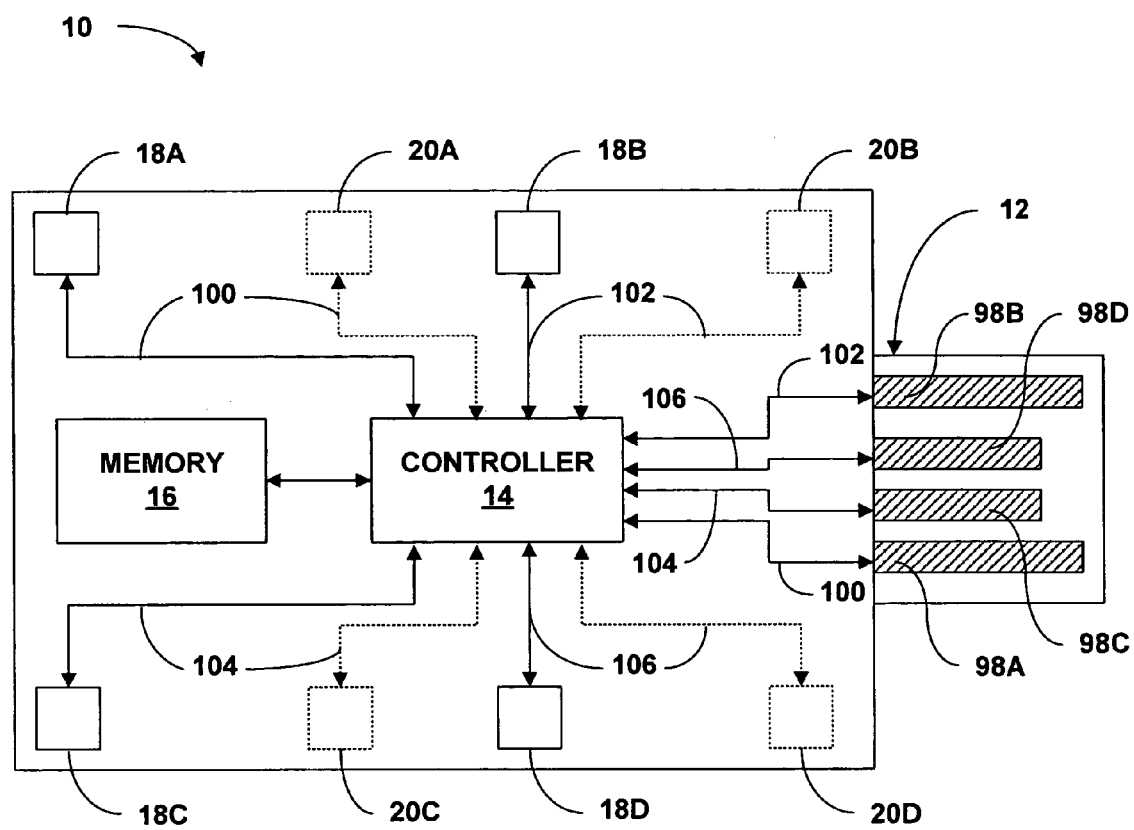
FIG. 3 is a block diagram illustrating the memory device from FIG. 2 as a universal serial bus (USB) memory device.

FIG. 3 is a block diagram illustrating memory device 10 as a universal serial bus (USB) memory device. As illustrated in FIG. 2, memory device 10 includes host connector 12, controller 14, memory 16, first set of electrical connectors 18, and second set of electrical connectors 20.

In the embodiment illustrated in FIG. 3, host connector 12 conforms to a USB standard. However, the description of this embodiment should not be seen as limiting the invention in any way. In other embodiments, host connector 12 may conform to one of the other host connection standards listed above. Host connector 12 includes host connector contacts 98A–98D. Each of host connector contacts 98A–98D provides a signal from the host computer to controller 14. Host connector contact 98A provides a ground signal 100 to controller 14. Host connector 98B provides a power signal 102. Host connector contacts 98C and 98D respectively provide a positive data signal 104 and a negative data signal 106 to controller 14. In other embodiments, host connector 12 may conform to another host connection standard that may include any number of host connection contacts designed to carry a variety of signals.

Controller 14 receives the signals from host connector 12 and forwards the signals to first and second sets of electrical contacts 18 and 20. Electrical contacts 18A and 20A both receive ground signal 100 from controller 14. Electrical contacts 18B and 20B receive power signal 102. Positive data signal 104 is sent to electrical contacts 18C and 20C. Negative data signal 106 is sent from controller 14 to electrical contacts 18D and 20D. In this way, the signals from the host computer are distributed from memory device 10 to other devices coupled to first set of electrical contacts 18 and/or second set of electrical contacts 20. Advantageously, the number of contacts disposed on host connector 12 is the same as the number of contacts 18 and the same as the number of contacts 20, which allows different sets of contacts to be used in a similar manner for data transfer.

Another memory device, such as second memory device 10B from FIG. 1, may be coupled to memory device 10 by coupling a set of electrical contacts disposed on a major bottom surface of the other memory device to first set of electrical contacts 18 disposed on a top major surface of memory device 10. As an example, memory device 10 receives ground signal 100 from a host computer via host connector contact 98A. Controller 14 receives ground signal 100 and distributes the signal to electrical contact 18A. Ground signal 100 then propagates to the additional memory device coupled to memory device 10 via the corresponding electrical contact of the additional memory device, when the corresponding electrical contact is coupled to electrical contact 18A of memory device 10.

The electrical contacts of the other memory device may be self configured. In other words, depending on how the other memory device is coupled to first or second set of electrical contacts 18 or 20 of memory device 10, the connection points of the other device will reconfigure to match electrical contacts 18 or 20. In that way, another device can be connected to memory device 10 in any mechanically possible way and still operate properly with memory device 10.

In the case of one or more memory devices connected to the host computer through memory device 10, controller 14 acts as a master controller, and various controllers included in the other memory devices act as servant controllers. In other words, controller 14 manages communication between the host computer and memory 16 as well as the memories that are included in one or more additional memory devices coupled to memory device 10. Such an arrangement of master-servant controllers is sometimes referred to as a master-slave arrangement.

Figure 4:
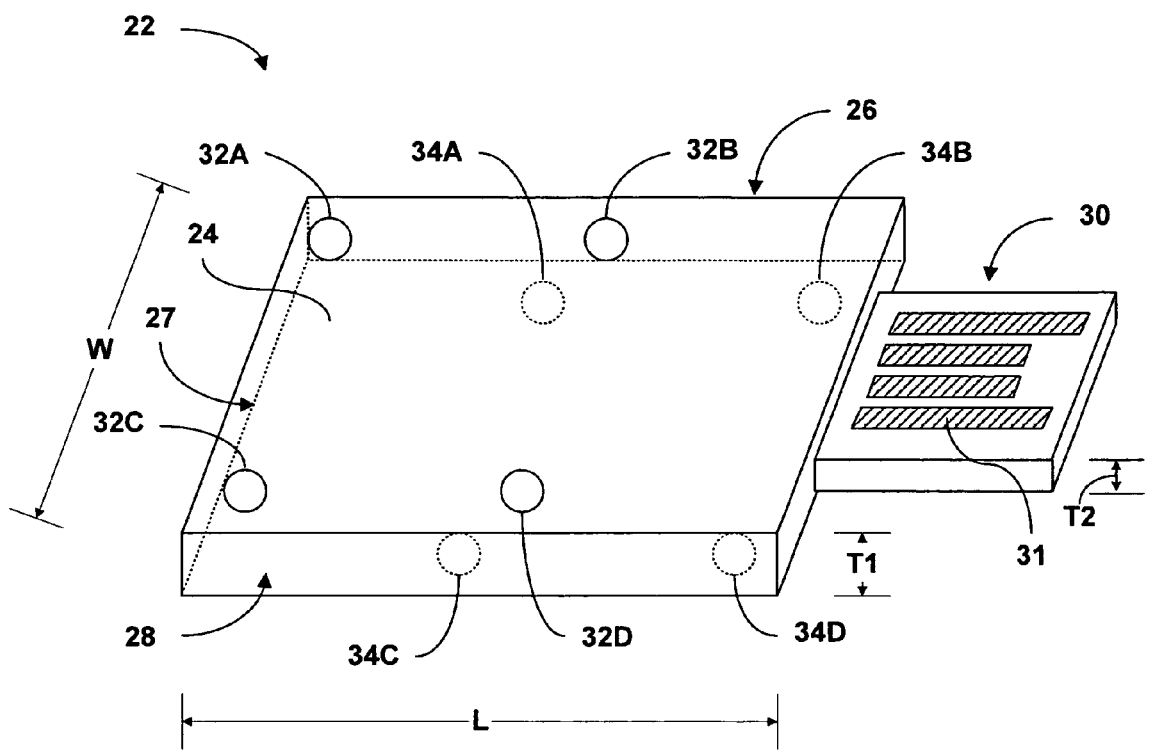
FIG. 4 is a schematic diagram illustrating an exemplary embodiment of a memory device.

FIG. 4 is a schematic diagram illustrating an exemplary embodiment of a memory device 22 which may correspond to memory device 10. Memory device 22 comprises a memory device housing 24 that includes a top major surface 26, a bottom major surface 27, and an edge 28 connecting top major surface 26 and bottom major surface 27. Memory device 22 also includes a host connector 30 protruding from edge 28, host connector contacts 31 disposed on host connector 30, a first set of electrical contacts 32A–32D accessible through top major surface 26, and a second set of electrical contacts 34A–34D accessible through bottom major surface 27. In the embodiment shown in FIG. 4, host connector 30 conforms to a USB tab. In other embodiments, host connector 30 may conform to meet other host connection standards, such as the standards listed above, or possibly another standard yet developed. Furthermore, the first and second sets of electrical contacts may comprise any number of electrical contacts disposed in a variety of locations and patterns on memory device housing 24.

Memory device 22 operates substantially similar to memory device 10 from FIGS. 2 and 3. Memory device 22 may be connected to a host computer by inserting host connector 30 into a host computer interface included in the host computer. Host connector contacts 31 couple to corresponding contacts included in the host computer interface to allow power and data to flow between memory device 22 and the host computer.

A device, such as another memory device, may be connected to the host computer through memory device 22 by coupling a set of electrical contacts included in the other device to either first set of electrical contacts 32 or second set of electrical contacts 34. The other device couples to memory device 22 via first set of electrical contacts 32 when placed adjacent top major surface 26 of memory device housing 24. Alternatively, the other device couples to memory device 22 via second set of electrical contacts 34 when placed adjacent bottom major surface 27 of memory device housing 24. A controller (not shown) included in memory device 22 routes power and data between first and second sets of electrical contacts 32 and 34 and the host computer.

First set of electrical contacts 32 may comprise magnets of a first polarization and second set of electrical contacts 20 may comprise magnets of a second polarization substantially opposite the first polarization. In other embodiments, first set of electrical contacts 18 comprises sockets and second set of electrical contacts 20 comprises pins, or vice versa. Therefore, a plurality of memory devices substantially similar to memory device 22 may be stacked adjacent one another and connected to the host computer via host connector 12 included in memory device 22.

In the embodiment illustrated in FIG. 4, memory device 22 comprises a memory drive, such as a USB flash memory drive. A flash memory drive includes an internal, high-speed solid-state memory capable of persistently storing data without application of power. In addition, flash memory drives are compact, easy to use, and have no moving parts.

Furthermore, host connector 30 may comprise a thickness T2 equal to or less than thickness T1 of memory card housing 24. In the illustrated embodiment, host connector 30 comprises a USB connector. In some embodiments, host connector 30 comprises a USB compatible tab with a conventional USB electrical shield. In other embodiments, host connector 30 comprises a USB compatible tab without an electrical shield. The invention described herein does not require the use of a cable to transmit data signals, because host connector 30 is directly coupled to both an internal memory of memory card 22 and a host computer interface. Therefore an electrical shield around host connector 30 can be eliminated. Furthermore the elimination of the electrical shield enables host connector 30 to conform to a thin form factor of memory card 22. The USB compatible tab may have a thickness of approximately 2.0 mm while a conventional USB plug including the electrical shield may have a thickness of approximately 4.5 mm, which may be larger than the form factor of memory card 22.

Figure 5A:
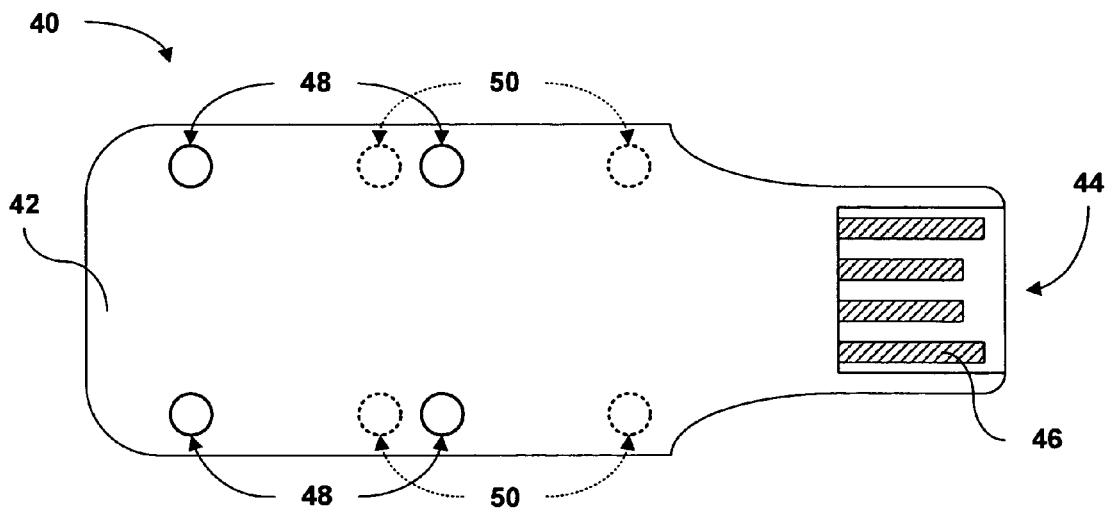
FIG. 5A is a schematic diagram illustrating a top view of a memory device.

FIG. 5A is a schematic diagram illustrating a top view of a memory device 40, which may correspond to memory device 10. Memory device 40 includes a memory device housing 42, a host connector 44, host connector contacts 46, a first set of electrical contacts 48, and a second set of electrical contacts 50. First set of electrical contacts 48 are accessible through a top major surface of memory device housing 42 and second set of electrical contacts 50 are accessible through a bottom major surface of memory device housing 42. Memory device 40 operates substantially similar to memory device 10 described in reference to FIGS. 2 and 3.

Memory device 40 may be connected to a host computer by inserting host connector 44 into a host computer interface included in the host computer. Host connector contacts 46 couple to contacts included in the host computer interface in the host computer to allow power and data to flow between memory device 40 and the host computer.

A device, such as another memory device, may be connected to the host computer through memory device 40 by coupling a set of electrical contacts included in the device to either first set of electrical contacts 48 or to second set of electrical contacts 50. A controller (not shown) included in memory device 22 routes power and data between first and second sets of electrical contacts 48 and 50 and the host computer.

Figure 5B:
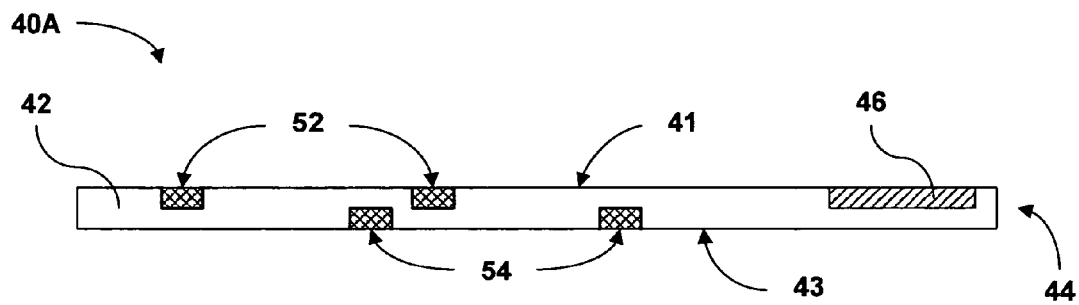
FIG. 5C is a schematic diagram illustrating an exemplary side view of another embodiment of the memory device from FIG. 5A.

FIG. 5B is a schematic diagram illustrating an exemplary side view of a memory device 40A. Memory device 40A comprises one embodiment of memory device 40 from FIG. 5A. In the illustrated embodiment, memory device 40A includes a first set of magnets 52 at first set of electrical contacts 48 and a second set of magnets 54 at second set of electrical contacts 50. First set of magnets 52 may comprise a first magnetic polarization and second set of magnets 54 may comprise a second magnetic polarization substantially opposite the first polarization. As shown in FIG. 5B, first and second sets of magnets 52 and 54 are substantially flush with a top major surface 41 of memory device housing 42 and a bottom major surface 43 of memory device housing 42, respectively.

Another memory device, substantially similar to memory device 40A, may connect with memory device 40A when placed adjacent top major surface 41 of memory device housing 42 by coupling a set of magnetic electrical contacts disposed on the memory device to first set of magnets 52. The set of magnetic electrical contacts may comprise a magnetic polarization substantially opposite the polarization of first set of magnets 52, such that the opposite magnetic fields create an automatic, self-aligning connection between the memory devices. A memory device may also be connected to memory device 40A by using second set of magnets 54 substantially similar to first set of magnets 52 as described above.

Figure 5C:
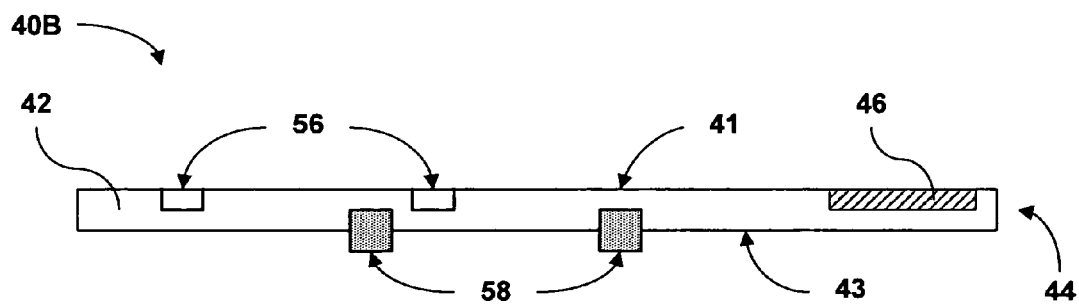

FIG. 5C is a schematic diagram illustrating an exemplary side view of a memory device 40B. Memory device 40B comprises another embodiment of memory device 40 from FIG. 5A. In the illustrated embodiments, memory device 40B includes a set of sockets 56 at first set of electrical contacts 48 and a set of pins 58 at second set of electrical contacts 50. As shown in FIG. 5C, set of sockets 56 are substantially flush with top major surface 41 of memory device housing 42 and set of pins 58 protrude from bottom major surface 43 of memory device housing 42. The pins and sockets could be magnetic or mechanical in order to couple the device to another device.

Another memory device, substantially similar to memory device 40B, may connect with memory device 40B when placed adjacent top major surface 41 of memory device housing 42 by coupling a set of electrical contact pins protruding from the memory device to set of sockets 56. The set of electrical contact pins may fit into set of sockets 56 such that the memory devices self-align. A memory device may also be connected to memory device 40B by using set of pins 58 to couple to a set of electrical contact sockets disposed on the memory device.

Figure 6A:
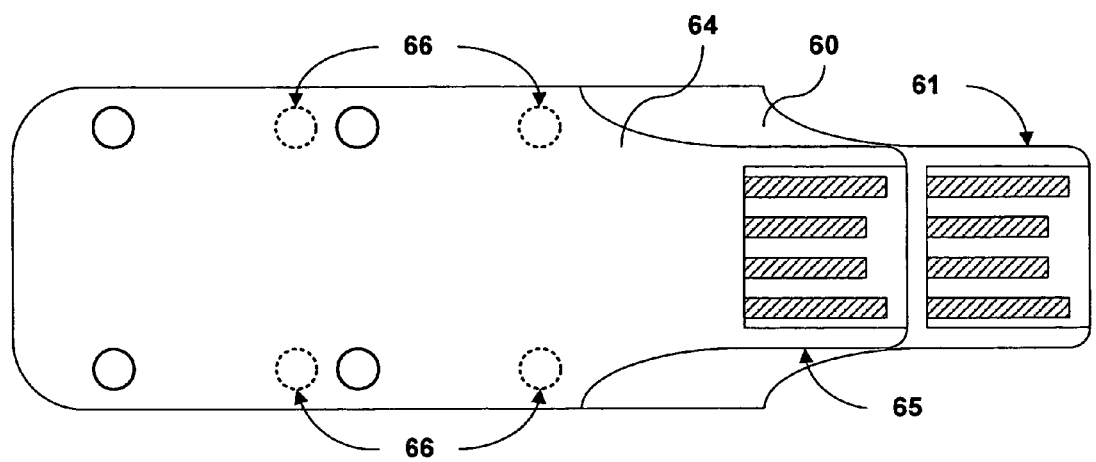
FIG. 6A is a schematic diagram illustrating a top view of a first memory device and a second memory device coupled to each other.

FIG. 6A is a schematic diagram illustrating a top view of a first memory device 60 and a second memory device 64 coupled to each other. First memory device 60 comprises a first host connector 61. Second memory device 64 comprises a second host connector 65. First and second memory devices 60 and 64 are coupled at electrical contact points 66.

Electrical contact points 66 include a set of electrical connectors accessible through a bottom major surface of second memory device 64 and a set of electrical contacts accessible through a top major surface of first memory device 60.

Memory devices 60 and 64 may be connected to a host computer by inserting host connector 61 of first memory device 60 into a host computer interface included in the host computer. A master controller (not shown) included in first memory device 60 routes power and data from the host computer to both first memory device 60 and second memory device 64. As shown in FIG. 6A, first and second memory devices 60 and 64 are connected such that second host connector 65 is offset from first host connector 61. In this way, first host connector 61 can make a direct connection with the host computer interface to couple first and second memory devices 60 and 64 to the host computer.

Figure 6B:
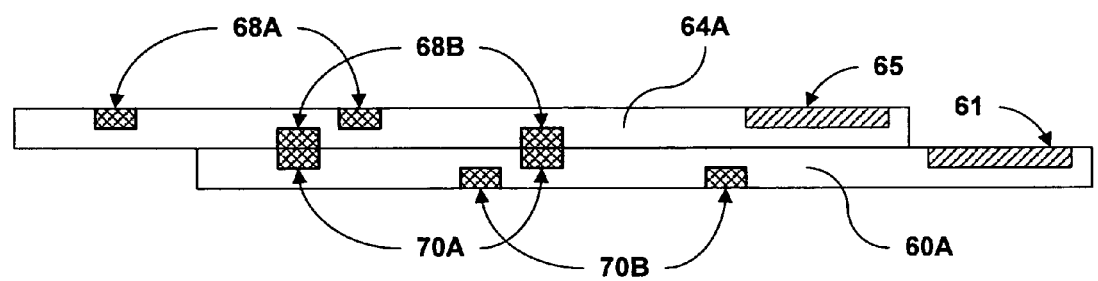
FIG. 6B is a schematic diagram illustrating an exemplary side view of one embodiment of the memory devices from FIG. 6A.

FIG. 6B is a schematic diagram illustrating an exemplary side view of a first memory device 60A coupled to a second memory device 64A. First memory device 60A comprises one embodiment of first memory device 60 from FIG. 6A and second memory device 64A comprises one embodiment of second memory device 64 from FIG. 6A. In the illustrated embodiment, first memory device 60A includes a first set of electrical contact magnets 70A disposed on a top major surface of first memory device 60A and a second set of electrical contact magnets 70B disposed on a bottom major surface of first memory device 60A. Second memory device 64A includes a third set of electrical contact magnets 68A disposed on a top major surface of second memory device 64A and a fourth set of electrical contact magnets 68B disposed on a bottom major surface of second memory device 64A.

First set of electrical contact magnets 70A may comprise a first magnetic polarization and fourth set of electrical contact magnets 68B may comprise a second magnetic polarization substantially opposite the first polarization. In that way, first set of magnets 70A of first memory device 60A and fourth set of magnets 68B of second memory device 64A create an automatic, self-aligning connection between the memory devices 60A and 64A. First and fourth sets of electrical contact magnets 70A and 68B correspond to electrical contact points 66 in FIG. 6A.

In some embodiments, additional memory devices may be connected to the host computer by coupling to second set of electrical contact magnets 70B of first memory device 60A or third set of electrical contact magnets 68A of second memory device 64A. In the illustrated embodiment, the memory device located at the bottom of the stack of memory devices comprises the master memory device. In other words, a host connector included in the bottom memory device is inserted into a host computer interface of a host computer and a controller included in the bottom memory device manages the flow of data between the host computer and each of the stacked memory devices.

Figure 6C:
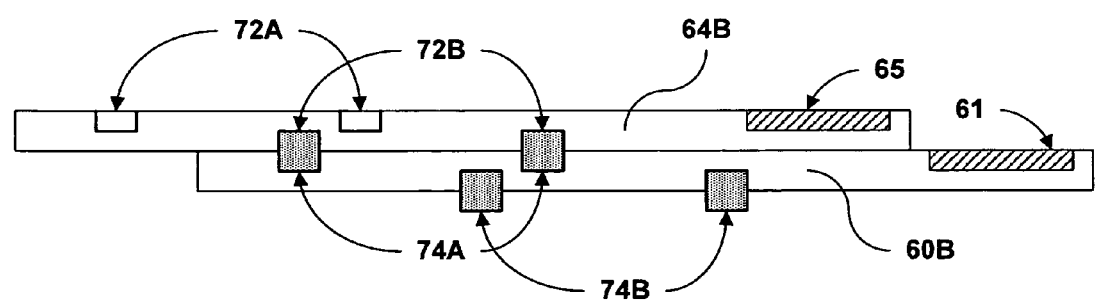
FIG. 6C is a schematic diagram illustrating an exemplary side view of another embodiment of the memory devices from FIG. 6A.

FIG. 6C is a schematic diagram illustrating an exemplary side view of a first memory device 60B coupled to a second memory device 64B. First memory device 60B comprises another embodiment of first memory device 60 from FIG. 6A and second memory device 64B comprises another embodiment of second memory device 64 from FIG. 6A. In the illustrated embodiment of FIG. 6C, first memory device 60B includes a first set of electrical contact sockets 74A disposed on a top major surface of first memory device 60B and a first set of electrical contact pins 74B disposed on a bottom major surface of first memory device 60B. The pins and sockets may be magnetic or simply mechanical in nature. Second memory device 64B includes a second set of electrical contact sockets 72A disposed on a top major surface of second memory device 64B and a second set of electrical contact pins 72B disposed on a bottom major surface of second memory device 64B.

In a mechanical embodiment, first set of pins 72B may snap into second set of sockets 74B. In that way, first set of pins 72B of second memory device 64B and second set of sockets 74A of first memory device 60B create a self-aligning connection between the memory devices 60B and 64B. First set of sockets 74A and second set of pins 72B correspond to electrical contact points 66 in FIG. 6A. In some embodiments, additional memory devices may be connected to the host computer by coupling to second set of sockets 72A of second memory device 64B or first set of pins 74B of first memory device 60B.

As shown in both FIGS. 6B and 6C, the electrical contacts accessible through a top major surface of the memory cards may be staggered relative to the electrical contacts accessible through a bottom major surface of the memory cards. Therefore, second memory device 64 is offset from first memory device 60 when the memory devices are coupled at electrical contact points 66. The offset between memory devices 60 and 64 is defined by a form factor of the host connectors 61 and 65. The offset eliminates overlap between second host connector 65 and first host connector 61 when the memory devices are placed adjacent one another and allows a clear connection of host connector 61 to the host computer interface of the host computer. In addition, the offset substantially eliminates interference between the set of electrical contacts disposed on a top major surface of a memory card and the set of electrical contacts disposed on a bottom major surface of the memory card.

Figure 7:
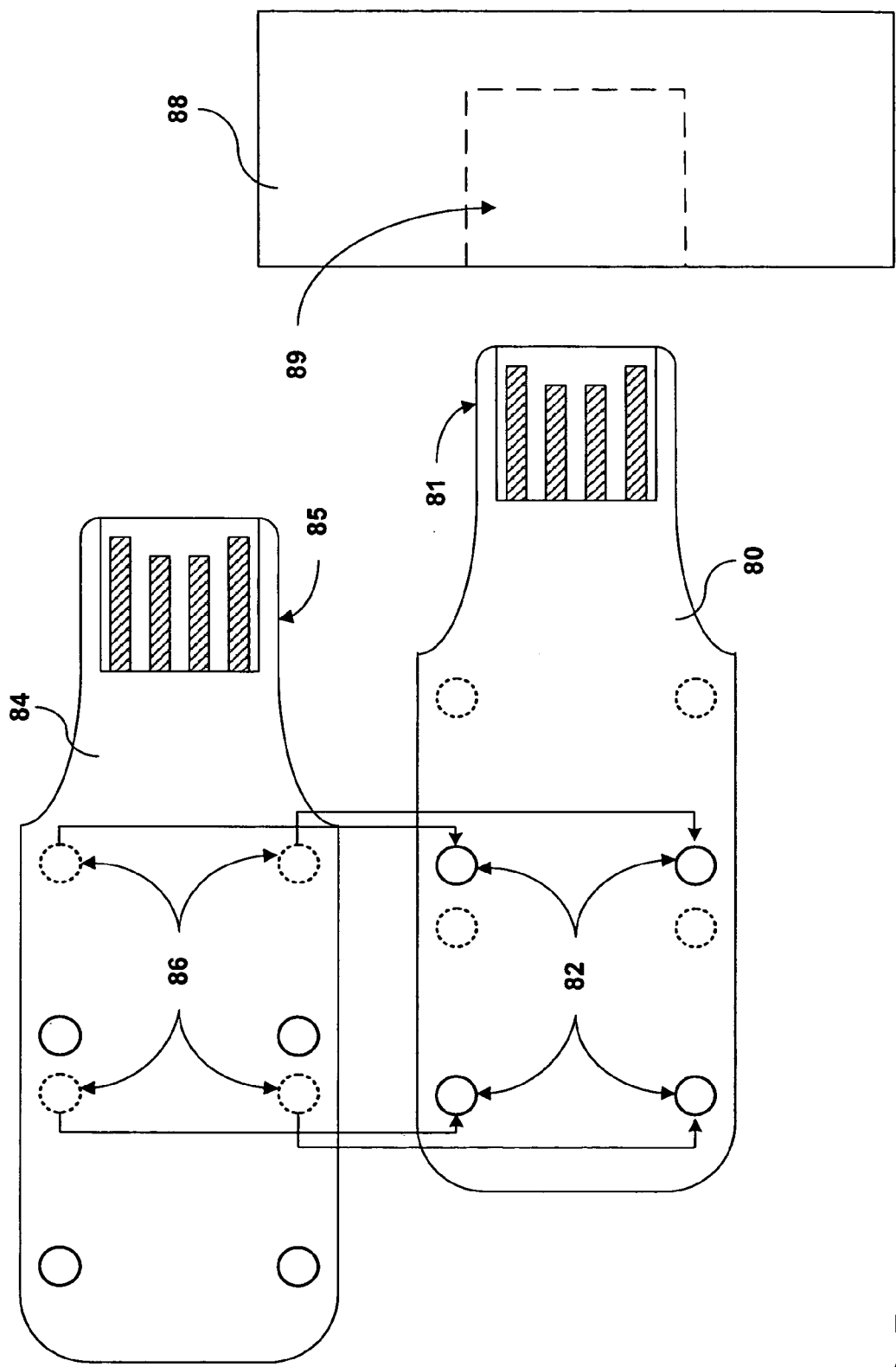
FIG. 7 is a schematic diagram illustrating an exemplary system of two memory devices coupled to a host computer.

FIG. 7 is a schematic diagram illustrating an exemplary system of two memory devices 80 and 84 coupled to a host computer 88. Host computer 88 includes a host computer interface 89. Host computer interface 89 is compatible with a host connection standard, e.g., USB or USB2. A first memory device 80 includes a first host connector 81 and a first set of electrical contacts 82 accessible through a top major surface of first memory device 80. A second memory device 84 includes a second host connector 85 and a second set of electrical contacts 86 accessible through a bottom major surface of second memory device 84. First and second memory devices 80, 84 operate substantially similar to memory device 10 described in reference to FIGS. 2 and 3.

First memory device 80 couples to host computer 88 by inserting first host connector 81 into host computer interface 89. First host connector 81 conforms to the host connection standard with which host computer interface 89 is compatible. First host connector 81 provides host computer 88 access to a first memory included within first memory device 80. First memory device 80 also includes a first controller, which electrically couples first host connector 81 to the first memory and to first set of electrical contacts 82. First memory device 80 may also include a set of electrical contacts accessible through a bottom major surface of first memory device 80. In that case, the first controller also electrically couples first host connector 80 to the other set of electrical contacts.

Second memory device 84 couples to host computer 88 via first memory device 80 by coupling second set of electrical contacts 86 to first set of electrical contacts 82. Coupling second set of electrical contacts 86 to first set of electrical contacts 82 provides host computer 88 access to a second memory included within second memory device 84 via the first controller of first memory device 80. Second memory device 84 also includes a second controller, which electrically couples second set of electrical contacts 86 to the second memory. Second set of electrical contacts 86 of second memory device 84 may be self configured upon coupling to first set of electrical contacts 82. In other words, depending on how second memory device 84 is coupled to first set of electrical contacts 82 of first memory device 80, second set of electrical contacts 86 will reconfigure to match first set of electrical contacts 82. In that way, second memory device 84 can be connected to first memory device 80 in any mechanically possible way and still operate properly.

Again, when first and second memory devices 80 and 84 are coupled to each other, the first controller of first memory device 80 acts as a master controller and the second controller of second memory device 84 acts as a servant controller. The controllers of both memory devices 80 and 84 may be programmed with master and servant capabilities. The master controller operation may be triggered when a memory device receives power via a host connector and the servant controller operation may be triggered when a memory device receives power via a set of electrical contacts.

The first controller provides read/write data access to the first memory in first memory device 80 along with accessing the second memory in second memory device 84 through the first and second sets of electrical contacts 82 and 86. The first controller of first memory device 80 virtualizes the first memory and the second memory to be a single, larger memory and presents the single memory to host computer 88. A user of host computer 88 may store data in the single memory presented by the first controller of first memory device 80. The first controller of first memory device 80 is responsible for partitioning the received data to be stored in the first and second memory devices 80, 84. The first controller separates the data into independent data partitions and allocates the data partitions to the first and second memories of the first and second memory devices 80 and 84, respectively.

The data is partitioned such that each of the first and second memory devices 80 and 84 may be used as separate devices without corrupting the data stored in the respective memories. For example, when a data file is stored by the user of host computer 88 on the single memory presented by the first controller, the first controller will save the data file on either first memory device 80 or second memory device 84. In this way, if each memory device is used separately, the data file can still be accessed by host computer 88. Therefore, a file allocation table of each of first and second memory devices 80 and 84 must be updated to reflect the data file storage. However, the first controller of first memory device 80 will present only one virtual file allocation table to host computer 88. If first memory device 80 is used as a separate device, the first controller will use the local file allocation table and present that to host computer 88.

In the case where first and second memory devices 80 and 84 are secure memory devices requiring secure authentication to access the data stored in the first and second memories, first memory device 80 establishes a secure connection with host computer 88 to validate the authentication. After the secure connection is established, the first controller of first memory device 80 will establish a secure connection with second memory device 84 through first and second sets of electrical contacts 82 and 86. Once all secure connections are established, the first controller on first memory device 80 will virtualize the first and second memories and present a single, higher capacity memory to host computer 88.

In some embodiments, second memory device 84 may also include a set of electrical contacts accessible through a top major surface of second memory device 84. In that case, a third memory device may be coupled to host computer 88 via the top set of electrical contacts of second memory device 84. Any number of memory devices substantially similar to first and second memory devices 80 and 84 may be coupled together as illustrated in FIG. 7, as long as the memory devices do not exceed a power limitation of host computer interface 89.

As an example, host computer 88 provides first memory device 80 approximately 100 mA as a default upon insertion of first host connector 81 to host computer interface 89. First memory device 80 requires approximately 100 mA to operate. However, when second set of electrical contacts 86 couples to first set of electrical contacts 82, the host computer provides additional power to enable second memory device 84.

First memory device 80 may receive an additional 300 mA from host computer 88 in response to arbitration between device 80 and host computer 88, e.g., according to USB protocols. Second memory device 84 also requires approximately 100 mA to operate. Therefore, both first and second memory devices 80 and 84 may be enabled and the additional 200 mA may be made available at additional sets of electrical contacts that may be included in both first and second memory devices 80 and 84. In that case, a third and fourth memory device may be coupled to host computer 88 via the set of electrical contacts included in each preceding memory device. However, enough power is not available to enable a fifth device coupled to the fourth set of electrical contacts of the fourth memory device. The first controller located in first memory device 80 may disable the fourth set of electrical contacts so the user does not attempt to operate an under-powered device coupled to the fourth memory device.

Figure 8:
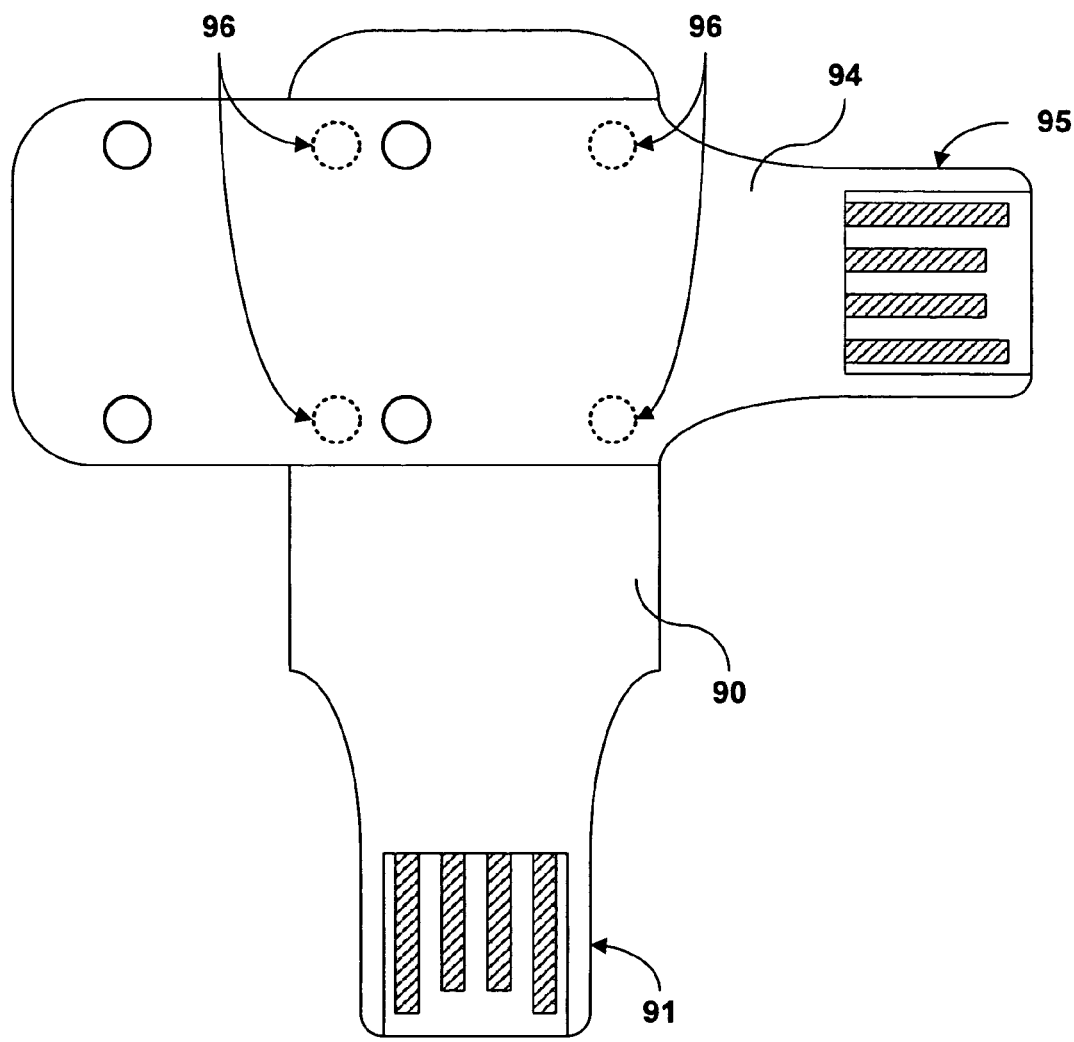
FIG. 8 is a schematic diagram illustrating another top view of a first memory device and a second memory device coupled to each other.

FIG. 8 is a schematic diagram illustrating a top view of a first memory device 90 and a second memory device 94 coupled to each other. First memory device 90 comprises a first host connector 91. Second memory device 94 comprises a second host connector 95. First and second memory devices 90 and 94 are coupled at electrical contact points 96. Electrical contact points 96 include a set of electrical connectors accessible through a bottom major surface of second memory device 94 and a set of electrical contacts accessible through a top major surface of first memory device 90. First and second memory devices 90, 94 operate substantially similar to memory device 10 described in reference to FIGS. 2 and 3.

As shown in FIG. 8, first and second memory devices 90 and 94 are connected such that first memory device 90 is perpendicular to second memory device 94. Second host connector 65 is offset from first host connector 61 by 90 degrees. In this way, first host connector 91 may make a clear connection to a host computer interface of a host computer to couple first and second memory devices 90 and 94 to the host computer.

In some embodiments, the sets of electrical contacts that correspond to electrical contact points 96 may be disposed on first and second memory devices 90 and 94 such that first and second memory device 90 and 94 may be adjacently stacked parallel to each other, as shown in FIG. 6A, or perpendicular to each other, as shown in FIG. 8. In this way, first memory device 90 may be designated as the master device to be plugged directly into the host computer interface of the host computer. Additional memory devices may then be coupled adjacent a top major surface and/or adjacent a bottom major surface of first memory device 90 without interfering with first host connector 91 inserted in the host computer interface.

In other embodiments, electrical contacts may be disposed in a variety of locations and patterns on a memory device. As one example, a first memory device may comprise a first set of channels formed in a first memory device housing with first electrical contacts disposed between the two channels. A second set of channels formed in a second memory device housing of a second memory device may couple with the first set of channels such that the second memory device slides adjacent the first memory device. As the second memory device slides over the first memory device, a second set of electrical contacts accessible through the second memory device housing couples with the first set of electrical contacts.

Figure 9:
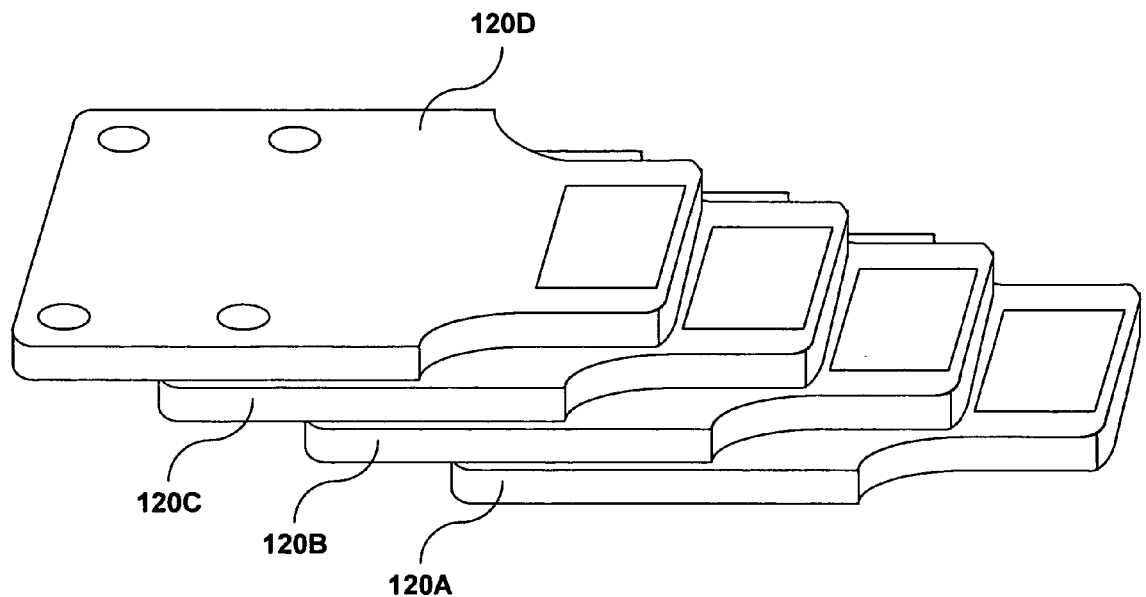
FIG. 9 is a schematic diagram illustrating four memory devices coupled to each other according to an embodiment of the invention.

FIG. 9 is a schematic diagram illustrating four memory devices coupled to one another according to an embodiment of the invention. Each of the four memory devices 120A–120D is substantially similar to one another and may operate substantially similar to memory device 10 described in relation to FIGS. 2 and 3. In the illustrated embodiment, first memory device 120A includes a host connector that may be inserted into a host computer interface of a host computer (not shown). Second memory device 120B couples to first memory device 120A via complementary electrical contacts on both first memory device 120A and second memory device 120B. Third memory device 120C couples to second memory device 120B via complementary electrical contacts on both second memory device 120B and third memory device 120C. Fourth memory device 120D couples to third memory device 120C via complementary electrical contacts on both third memory device 120C and fourth memory device 120D.

When first memory device 120A is directly coupled to the host computer, first memory device 120A becomes the master device. Each of memory devices 120B–120D is coupled to first memory device 120A through the preceding memory device. First memory device 120A creates a virtual memory that combines the storage capacity available in each of the memory devices 120A–120D. First memory device 120A presents the virtual memory to the host computer and allocates the received data for storage in each of the memory devices 120A–120D. Each of the servant memory device 120B–120D comprises an address so that the master memory device 120A can manipulate data traffic flow between the servant memory devices and the host computer. Whether a given device is assigned as a master or servant may be determined based on which set of contacts are used to provide power to the device. For example, only the one device that receives power directly from the host computer via a host computer interface may be assigned as the master of the set of memory devices 120A–120D.

Figure 10:
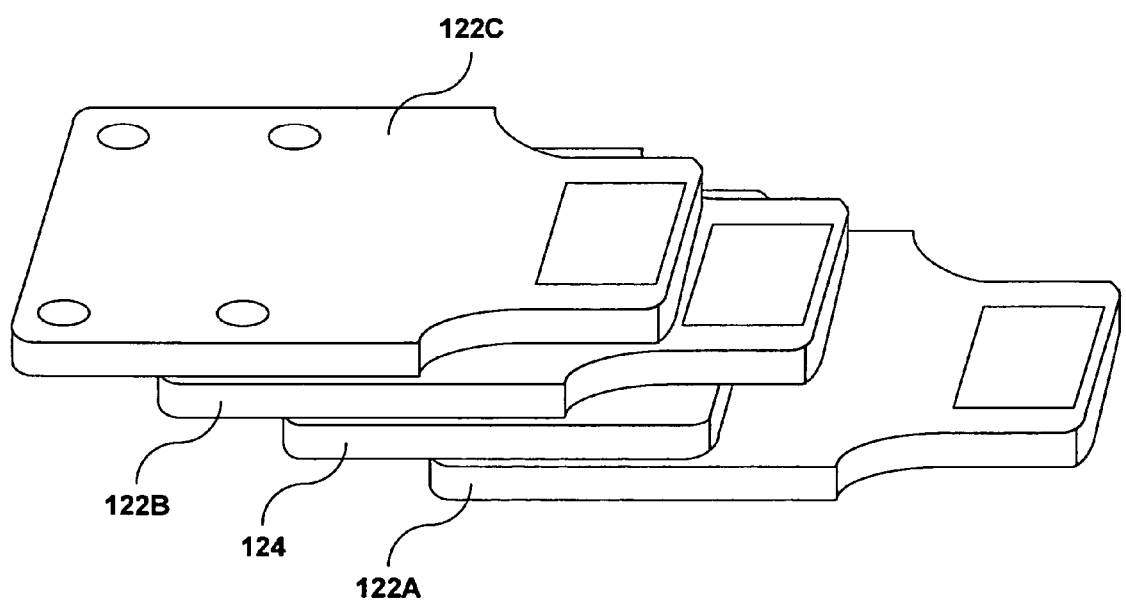
FIG. 10 is a schematic diagram illustrating three memory devices and a battery coupled to each other according to an embodiment of the invention.

FIG. 10 is a schematic diagram illustrating three memory devices and a battery coupled to each other according to an embodiment of the invention. Each of the three memory device 122A–122C is substantially similar to one another and may operate substantially similar to memory device 10 described in relation to FIGS. 2 and 3. Battery 124 may comprise a first set of electrical contacts disposed on a top major surface of a battery housing and a second set of electrical contacts disposed on a bottom major surface of the battery housing, substantially similar to the memory devices described herein.

In the illustrated embodiment, first memory device 122A includes a host connector that may be inserted into a host computer interface of a host computer (not shown). Battery 124 couples to first memory device 122A via complementary electrical contacts on both first memory device 122A and battery 124. Second memory device 122B couples to battery 124 via complementary electrical contacts on both battery 124 and second memory device 122B. Third memory device 122C couples to second memory device 122B via complementary electrical contacts on both second memory device 122B and third memory device 122C.

Battery 124 may function as a supplemental source of power, in addition to the host computer. For example, when the host computer does not provide enough power to enable first memory device 122A and any devices coupled to first memory device 122A, battery 124 may provide additional power sufficient to enable second memory device 122B and third memory device 122C. Battery 124 may also be used to synchronize memory devices 122A–122C without connecting the memory devices to the host computer. In that case, battery 124 provides power to memory devices 122A–122C to allow the data stored on each of the memory devices to replicate itself onto the other memory devices coupled to battery 124. The controllers of the memory devices may be programmed to perform such replication, when desired.

Figure 11:
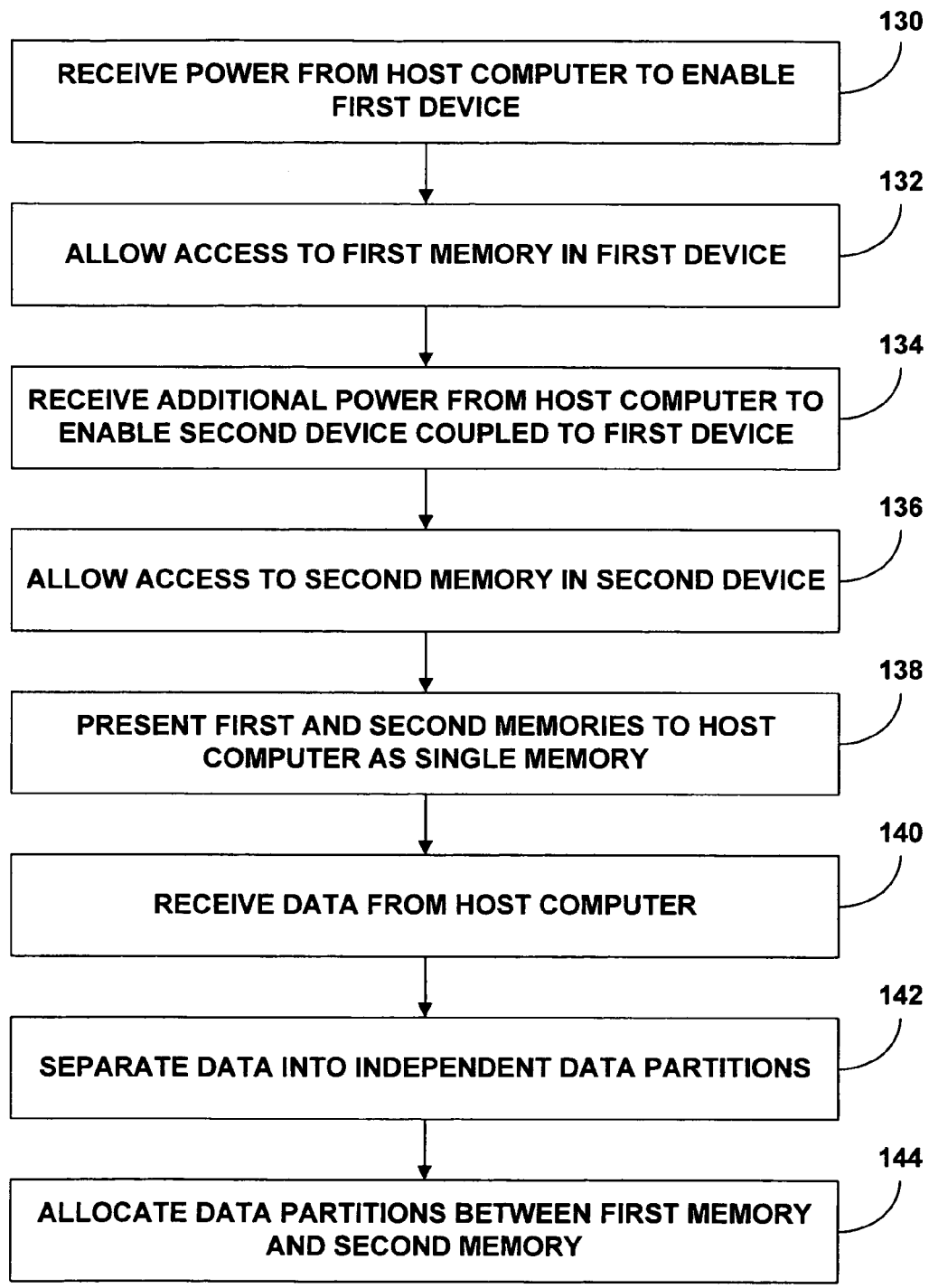
FIG. 11 is a flow chart illustrating an exemplary method of controlling two memory devices coupled to each other.

FIG. 11 is a flow chart illustrating an exemplary method of controlling two memory devices coupled to each other. The method may be applied to the system illustrated in FIG. 7. A first memory device 80 couples to a host computer 88 by inserting a first host connector 81 into a host computer interface 89 included in host computer 88. First memory device 80 also provides a first set of electrical contacts 82 to couple with a second set of electrical contacts 86 of a second memory device 84. The first and second sets of electrical contacts 82 and 86 connect second memory device 84 to host computer 88 through first memory device 80. In this way, first memory device 80 may expand an amount of storage capacity available to host computer 88 without requiring a user to purchase a new, higher capacity memory device that may be bulky and expensive.

Upon insertion of host connector 81 to host computer interface 89, first memory device 80 receives an amount of power from host computer 88 to enable first memory device 80 (130). In some cases, the amount of power received is a default amount of power provided to host computer interface 89 by host computer 88. As an example, the amount of power received may be approximately 100 mA. Once first memory device 80 receives the power from host computer 88, a first controller within first memory device 80 allows host computer 88 access to a first memory within first memory device 80 via first host connector 81 (132). Communication between host computer 88 and the first controller may then be sent through powered first host connector 81. Host computer 88 may read or modify data that is stored in the first memory as well as store new data or erase existing data. The first controller manipulates the data stored in the first memory according to operations specified by host computer 88.

When second memory device 84 is coupled to first memory device 80, first memory device 80 receives an additional amount of power to enable both first memory device 80 and second memory device 84 (134). The first controller of first memory device 80 routes the power from host computer 88 to second memory device 84 via first and second sets of electrical contacts 82 and 86. If first memory device 80 and second memory device 84 coupled to first memory device 80 require more power than is available to host computer interface 89, the first connector may disable first set of electrical contacts 82 so that a user cannot attempt to use an underpowered second memory device 84.

Once first memory device 80 receives the additional power from host computer 88, the first controller within first memory device 80 allows host computer 88 access to a second memory within second memory device 84 via first and second sets of electrical contacts 82 and 86 (136). The first controller of first memory device 80 operates as a master controller and a second controller included in second memory device 84 operates as a servant controller. In this way, coupling second memory device 84 to first memory device 80 creates a composite device in that second memory device 84 is dependant on first memory device 80 to communicate with host computer 88. The first controller provides read/write data access to the first memory in first memory device 80 along with accessing the second memory in second memory device 84 through the first and second sets of electrical contacts 82 and 86. The first controller of first memory device 80 virtualizes the first memory and the second memory to be a single, larger memory and presents the single memory to host computer 88 (138).

A user of host computer 88 may store data in the single memory presented by the first controller of first memory device 80. First memory device 80 receives the data from host computer 88 (140). The first controller of first memory device 80 is responsible for partitioning the received data to be stored in the first and second memory devices 80, 84. The first controller first separates the data into independent data partitions (142). The first controller then allocates the data partitions to the first and second memories of the first and second memory devices 80 and 84, respectively (144). The data is partitioned such that each of the first and second memory devices 80 and 84 may be used as separate devices without corrupting the data stored in the respective memories.

As an example, when a data file is stored by the user of host computer 88 on the single memory presented by the first controller, the first controller will save the data file on either first memory device 80 or second memory device 84. In this way, if each memory device is used separately, the data file can still be accessed by host computer 88. Therefore, a file allocation table of each of first and second memory devices 80 and 84 must be updated to reflect the data file storage. However, the first controller of first memory device 80 will present only one virtual file allocation table to host computer 88. If first memory device 80 is used as a separate device, the first controller will use the local file allocation table and present that to host computer 88.

Figure 12A:
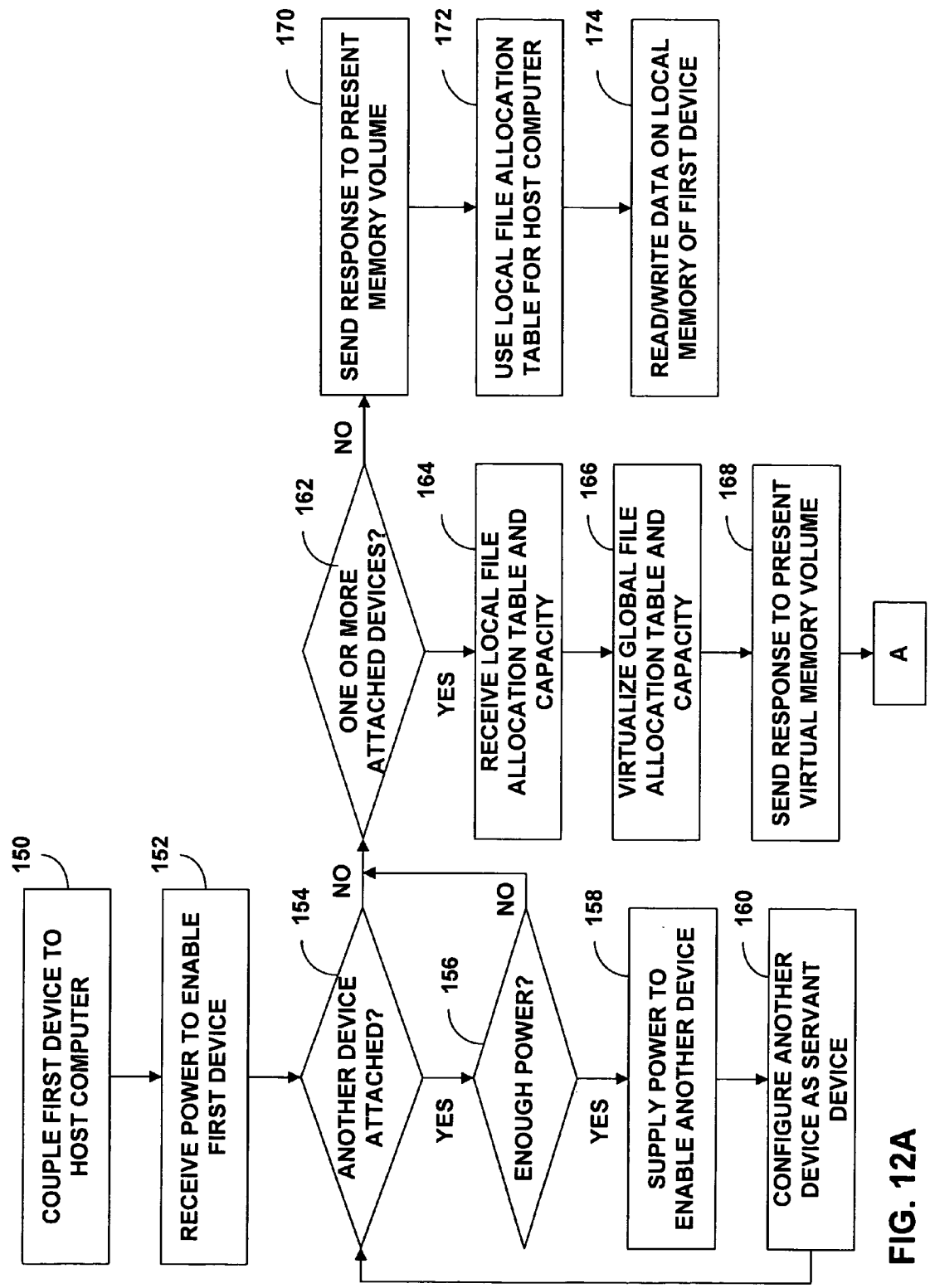
FIGS. 12A and 12B are flow charts illustrating an exemplary method of controlling one or more memory devices coupled to each other.
Figure 12B:
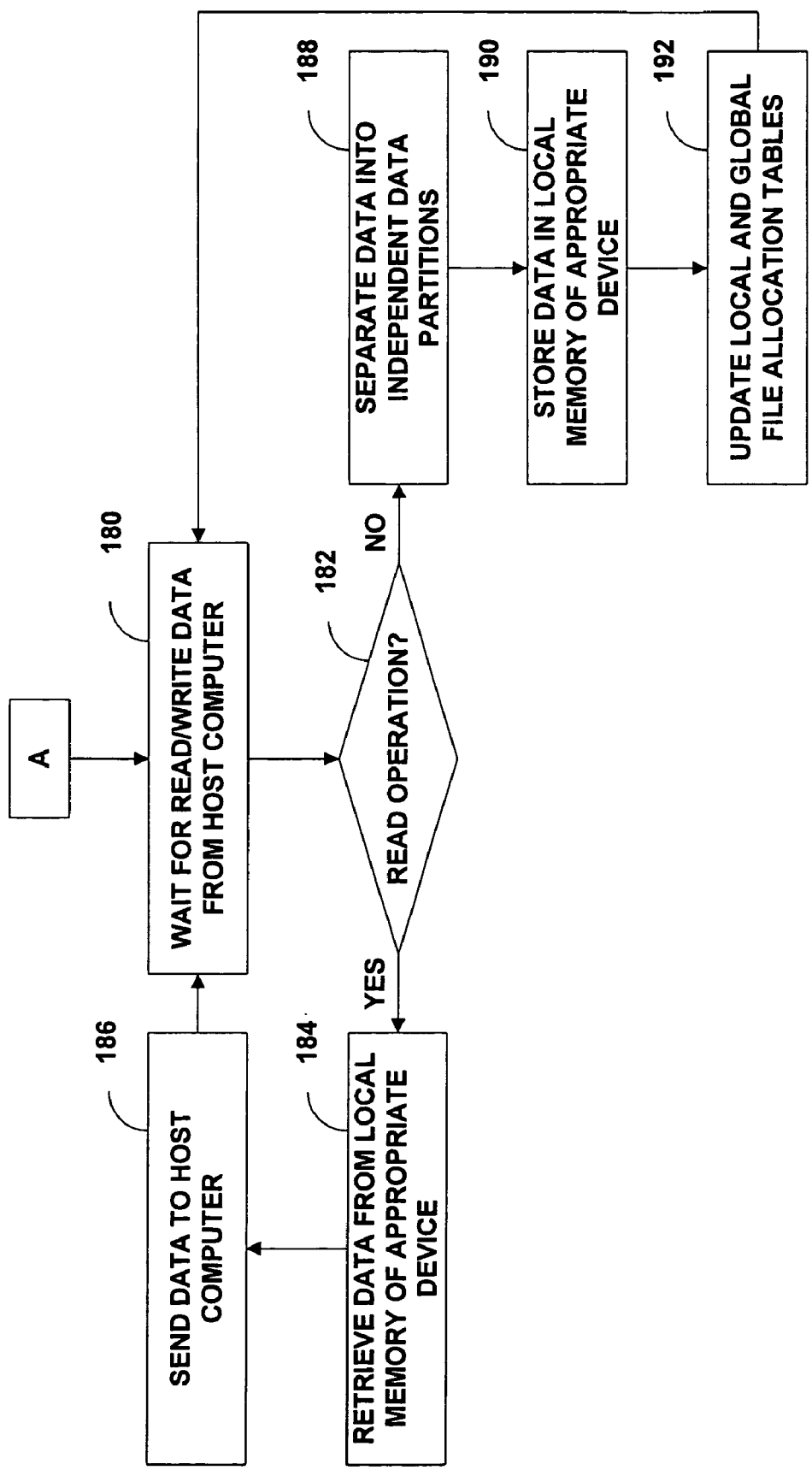

FIGS. 12A and 12B are flow charts illustrating an exemplary method of controlling one or more memory devices coupled to each other. The method may be applied to the system illustrated in FIG. 9. A first memory device 120A couples to a host computer by inserting a first host connector into a host computer interface included in the host computer (150). First memory device 120A also provides a first set of electrical contacts that may couple with a second set of electrical contacts of a second memory device 120B. The first and second sets of electrical contacts connect second memory device 120B to the host computer through first memory device 120A. In this way, first memory device 120A may expand an amount of storage capacity available to the host computer without requiring a user to purchase a new, higher capacity memory device that may be bulky and expensive.

Upon insertion of the first host connector to the host computer interface, first memory device 120A receives power from the host computer to enable first memory device 120A (152). In some cases, the amount of power received is a default amount of power provided to the host computer interface by the host computer. As an example, the default amount of power may be approximately 100 mA. A first controller within first memory device 120A may receive additional power to enable both first memory device 120A and other memory devices that may be coupled to first memory device 120A.

The first controller of first memory device 120A determines if another memory device is attached to first memory device 120A (154). In the case where first memory device 120A is the only device coupled to the host computer, the first controller determines that another device is not attached (no branch of 154) and that no memory devices are attached to first memory device 120A (no branch of 162). First memory device 120A then sends a response to the host computer to present a memory volume of first memory device 120A (170). The first controller uses a local file allocation table of first memory device 120A for the host computer (172). The first controller reads data from and/or writes data to a local memory within first memory device 120A in response to commands from the host computer (174). In this way, first memory device 120A operates as a conventional memory device.

If a second memory device 120B is coupled to first memory device 120A (yes branch of 154), the first controller determines if enough power has been received from the host computer to enable both first memory device 120A and second memory device 120B (156). If enough power is not available (no branch of 156), then second memory device 120B may not be enabled. If there is enough power to enable second memory device 120B (yes branch of 156), the first controller supplies power to enable second memory device 120B (158). The first controller of first memory device 120A acts as a master controller and configures a second controller within second memory device 120B to act as a servant controller (160). In other words, the first controller provides power and read/write data access to a first memory within first memory device 120A, and the first controller also provides power and read/write data access to a second memory within second memory device 120B.

Once second memory device 120B is configured, the master controller again determines of another memory device is attached to first memory device 120A via second memory device 120B. As shown in FIG. 9, if enough power is available at first memory device 120A, the master controller may supply power to and configure a third memory device 120C and a fourth memory device 120D.

When there is no additional memory device coupled to first memory device 120A (no branch of 154) or there is not enough power to enable the additional memory device (no branch of 156), then the master controller of first memory device 120A determines whether any memory devices are attached to first memory device 120A (162). In the case illustrated in FIG. 9, three memory devices 120B–120D are attached to first memory device 120A (yes branch of 162). The master controller of first memory device 120A receives the local file allocation table and capacity from each of the attached memory devices 120B–120D (164). The master controller then virtualizes a first memory in first memory device 120A and the memory within each of the attached memory devices 120B–120D to create a global file allocation table and capacity for all four memory devices (166). First memory device 120A than sends a response to the host computer to present a single virtual memory volume for all the memory devices 120A–120D (168).

FIG. 12B is a flow chart illustrating an exemplary method of controlling data storage on the memory devices coupled to each other. Once the single virtual memory volume is presented to the host computer (168), the master controller of first memory device 120A waits for instructions from the host computer to read data from the virtual memory or write data to the virtual memory (180). When instructions are received, the master controller determines if the instructions comprise a read operation (182).

If the host computer is requesting a read operation (yes branch of 182), the master controller of first memory device 120A retrieves the requested data from the local memory of the appropriate one of memory devices 120A–120D where the data is actually stored (184). The master controller than sends the retrieved data to the host computer (186). The master controller again waits for instructions for the host computer (180).

If the host computer is requesting a write operation (no branch of 182), the master controller separates the data stored in the virtual memory presented to the host computer into independent data partitions, i.e., files or folders (188). The master controller then stores each of the data partitions in the local memory of an appropriate one of memory devices 120A–120D, such that the data stored in the respective memories may be retrieved even when the memory devices are used as separate, individual memory devices (190). The master controller of first memory device 120A updates the local file allocation tables for each of the memory devices 120A–120D and updates the global file allocation table used by the host computer to reflect the newly stored data (192). The master controller again waits for instructions for the host computer (180).

Various embodiments of the invention have been described. For example, a memory device has been described that includes a first set of electrical contacts and a second set of electrical contacts for a device, such as another memory device, to couple to the memory device. In this way, the memory device may expand an amount of storage capacity available to a host computer without requiring a user to purchase a new, higher capacity memory device that may be bulky and expensive. When two memory devices are coupled to each other, a first controller of the first memory device acts as a master controller and a second controller of the second memory device acts as a servant controller. The first controller provides read/write data access to the first memory device and accesses the second memory device through electrical contacts disposed on both memory devices.

Nevertheless, various modifications may be made without departing from the scope of the invention. For example, the invention has been primarily described in terms of a USB memory drive including a set of USB contacts. Both the host connector and the set of electrical contacts of the memory device may conform to a variety of host connection standards. Any number of electrical contacts may be disposed on the memory device in a variety of patterns. Furthermore, the controller included in the memory device may be separated into a memory controller and a host connector controller. These and other embodiments are within the scope of the following claims.

The invention claimed is:

1. A memory device comprising:
   a housing including a top major surface and a bottom major surface connected by an edge;
   a memory in the housing;
   a host connector protruding from the edge of the housing, the host connector allowing access to the memory by a host computer upon insertion of the host connector into a host computer interface; and
   a first set of electrical contacts accessible through the top major surface of the housing and a second set of electrical contacts accessible through the bottom major surface of the housing,
   wherein at least one of the first and second set of electrical contacts allows access to another device by the host computer through the memory device upon coupling another set of electrical contacts included in the another device to the one of the first and second set of electrical contacts of the memory device such that the memory device and the another device are coupled when the host connector of the memory device is coupled with the host computer interface of the host computer and the host computer can access both the memory device and the another device trough the memory device.

2. The memory device of claim 1, further comprising a controller electrically coupled to the memory, the host connector, the first set of electrical contacts, and the second set of electrical contacts, wherein the host connector allows access to the memory via the controller.

3. The memory device of claim 1, wherein each of the first and second sets of electrical contacts corresponds to contact points on the host connector.

4. The memory device of claim 1, wherein the first set of electrical contacts and the second set of electrical contacts respectively include contacts that correspond to a power signal, a ground signal, a data signal, and a control signal.

5. The memory device of claim 1, wherein the first set of electrical contacts of the memory device comprises magnets of a first polarization and the another set of electrical contacts of the another device comprises magnets of a second polarization substantially opposite the first polarization.

6. The memory device of claim 1, wherein the host connector conforms to a host connection standard and the host computer interface is compatible with the host connection standard.

7. The memory device of claim 1, wherein the another device comprises another memory device.

8. The memory device of claim 1, the wherein another device comprises a battery.

9. A system comprising:
   a host computer including a host computer interface;
   a first device including a first memory, a first device housing, a first set of electrical contacts accessible through a top major surface of the first device housing, and a host connector allowing access to the first memory by the host computer upon insertion of the host connector into the host computer interface of the host computer; and
   a second device including a second memory, a second device housing, and a second set of electrical contacts accessible through a bottom major surface of the second device housing all owing access to the second memory by the host computer when the host connector of the first device is inserted into the host computer interface of the host computer upon coupling the second set of electrical contacts to the first set of electrical contacts of the first device.

10. The system of claim 9, further comprising a third device including a third memory, a third device housing, and a third set of electrical contacts accessible through a surface of the third device housing allowing access to the third memory by the host computer when the host connector of the first device is inserted into the host computer interface of the host computer upon coupling the third set of electrical contacts to the second set of electrical contacts of the second device.

11. The system of claim 9, wherein the second set of electrical contacts of the second device are coupled to the first set of electrical contacts of the first device by placing the bottom major surface of the second device housing adjacent the top major surface of the first device housing.

12. The system of claim 9, wherein the first set of electrical contacts of the first device comprises magnets of a first polarization and the second set of electrical contacts of the second device comprises magnets of a second polarization substantially opposite the first polarization.

13. The system of claim 9, wherein the first set of electrical contacts of the first device comprises contacts mechanically fitted to the second set of electrical contacts of the second device.

* * * * *

UNITED STATES PATENT AND TRADEMARK OFFICE
CERTIFICATE OF CORRECTION

| | |
|---|---|
| PATENT NO. | : 7,184,264 B2 |
| APPLICATION NO. | : 10/949054 |
| DATED | : February 27, 2007 |
| INVENTOR(S) | : Trung V. Le |

It is certified that error appears in the above-identified patent and that said Letters Patent is hereby corrected as shown below:

Column 20
    Line 15, "trough" should read --through--.
    Line 41, "the wherein" should read --wherein the--.
    Line 56, "all owing" should read --allowing--.

Signed and Sealed this

Twenty-fourth Day of June, 2008

JON W. DUDAS
*Director of the United States Patent and Trademark Office*